UNITED STATES PATENT OFFICE.

WILLIAM H. NASH, OF READING, MASSACHUSETTS.

ARTIFICIAL LEATHER.

SPECIFICATION forming part of Letters Patent No. 304,229, dated August 26, 1884.

Application filed January 15, 1884. (Specimens.)

*To all whom it may concern:*

Be it known that I, WILLIAM H. NASH of Reading, in the county of Middlesex and State of Massachusetts, have invented certain Improvements in Artificial Leather, of which the following is a specification.

This invention relates to the class of goods known as "leatherette," and produced by applying a coating-composition to a sheet or backing of cloth, paper, or other material.

The invention has for its object to produce an artificial leather of an improved quality and at a smaller cost than heretofore; and to this end it consists in the improvements in the manufacture of the above-named class of goods, which I will now proceed to describe.

In carrying out my invention I apply to a sheet or backing of cloth, paper, or other suitable flexible material, a coating or base composed of about equal parts of alkali, oil, glue, tannic acid, and pigments, or mineral oxides or carbonates. This composition is applied in a liquid or semi-liquid form to the backing, by means similar to those now used in the manufacture of leatherette. The body thus formed is flexible and durable, but of itself is not adapted to resist water. To give the material a water-repellent quality, I apply to the body formed as above stated a mixture composed of ether, oil, alcohol, nitro-cellulose, and camphor. This mixture may be applied as a coating to the body after the application of the latter to the backing, in case it is desirable to make the product somewhat porous and not fully water-proof. In such case a small quantity of the last-described mixture will suffice, only a thin surface-coat being required. The porosity of the product may be decreased and its water-repelling quality increased by increasing the quantity of the coating; but if a fully water-proof product is desired the coating-mixture should be used as a carrier, and be mixed with the ingredients of the body before the application of the body to the backing. A larger quantity of the mixture will be required as a carrier than as a coating, and the expense of the product will be correspondingly increased; but it will be rendered practically impervious to water. The cheaper product coated as described will be quite as desirable, however, for many purposes—such as, linings for boots and shoes, upholstering material, pocket-books, &c.

The outer surface of the material may be embossed or calendered in the usual manner, in imitation of any desired quality or kind of leather.

My improved product has a greater chemical resemblance to natural leather than any of the artificial leathers or leatherettes heretofore produced, and is softer and more pliable, because it is made in part of the softer gums instead of the harder gums, varnishes, shellacs, copals, and resins heretofore employed; consequently it is not liable to crack nor retain wrinkles or creases.

I claim—

1. As an article of manufacture, an artificial leather chemically resembling natural leather and composed of a soft and pliable body, substantially such as herein described, applied to a suitable backing, and a water-repellent coating or carrier, as set forth.

2. As an article of manufacture, the improved artificial leather composed of alkali, oil, glue, tannic acid, and pigments, or their equivalents, applied as a body to a suitable backing, and a water-repellent mixture, substantially as described, applied either as a coating or as a carrier, as set forth.

3. The improved artificial leather composed of alkali, oil, glue, tannic acid, and pigments, or their equivalents, applied as a body to a suitable backing, and ether, oil, alcohol, nitro-cellulose, and camphor, applied either as a coating or as a carrier, as set forth.

In testimony whereof I have signed my name to this specification, in the presence of two subscribing witnesses, this 12th day of January, 1884.

WILLIAM H. NASH.

Witnesses:
C. F. BROWN,
A. L. WHITE.